Patented Aug. 5, 1941

2,251,802

UNITED STATES PATENT OFFICE 2,251,802

PROCESS OF MAKING DIPOLYMER VARNISH

Irving Pöckel, Montclair, N. J., assignor to Ellis Foster Company, a corporation of New Jersey No Drawing. Application July 29, 1939, Serial No. 287,241

2 Claims. (Cl. 260—23)

This invention relates to varnishes of the drying oil type and particularly to improved varnishes having, as a base thereof, a heat-treated mixture containing a terpene dipolymer and a drying oil such as tung oil.

It is well known that certain liquid terpene polymers possess drying qualities and their use as paint and varnish ingredients has been proposed. However, this drying quality is usually too feeble to be of importance in the practical use of polymerized terpenes for this purpose. This invention has for its object a method for the utilization of these cheap polymerized terpenes in paints and varnishes whereby they partially substitute the more expensive drying oils and confer advantageous properties to the composition.

When turpentine oil, alpha-pinene, dipentene, pine oil, and so forth, are treated with a mineral acid or an active acid earth or other polymerizing materials, several simultaneous reactions take place with the ultimate formation of two major products. One is a terpene material, alpha-terpinene (boiling point about 180° C.), and the other, a liquid diterpene, commonly known as dipolymer, having the composition $C_{20}H_{32}$ and boiling at 193-195° C. at 25 mm. pressure. The polymerized terpene may be isolated in pure form by distillation and may be further purified by treatment with activated charcoal or an activated earth. The preparation of the terpene dipolymer herein utilized has been described by Carter, Smith and Reed, J. Soc. Chem. Ind., 44, 543—7T (1925).

I have found that this dipolymer may be heated with an active drying oil such as China-wood oil or oiticica oil (that is, an oil containing conjugated double bonds) to produce a varnish that in the presence of driers may be baked to a hard film as quickly as the drying oil varnish itself. The dipolymer may be used in amounts up to 50% of the varnish base (bodied oil with or without oil-soluble resin) and renders the varnish films more resistant to moisture. If the dipolymer is merely added to the bodied varnish base, a varnish is obtained which does not air-dry readily but which can be baked. However, the resulting films are not as hard and tough as the varnish prepared by cooking the dipolymer with the oil. The cooking is preferably done at temperatures above about 200° C., preferably at about 220°–280° C. The dipolymer retards the gelation of tung oil and, therefore, leads to the preparation of varnish or enamel films having superior gas-proofness.

I have found, therefore, that by the use of this terpene dipolymer in conjunction with a drying oil such as tung oil, a superior baking varnish is obtained having excellent light-fastness, moisture- and alkali-resistance, good toughness and weathering qualities. Drying oils of the linseed type yield inferior results.

The following examples are given merely to illustrate the invention and I do not intend that the invention be limited to the specific quantities given. By parts is meant parts by weight.

*Example 1.*—2 parts of dipolymer, 4 parts of tung oil, and 3 parts of ester gum were heated at 250° C. until the desired consistency was obtained. The varnish after cooling to 140° C. was thinned with 9 parts of mineral spirits. Cobalt drier was added so that the varnish contained 0.01% cobalt (calculated as metal). Films of this varnish baked dry within 20 minutes at 125° C.

*Example 2.*—1 part of dipolymer, 3 parts of tung oil, and 2 parts of a rosin ester modified phenolic resin, known as Amberol F7, were heated at 250° C. until the desired consistency was obtained. The cooled varnish base was thinned with 6 parts of mineral spirits and a solution of cobalt drier (0.01% calculated as metal) was added. Films of this varnish baked dry at 125° C. within 20 minutes.

*Example 3.*—4 parts of dipolymer, 6 parts of tung oil, and 5 parts of a rosin maleic glyceride resin, known as Amberol 801, were heated at 250° C. until the desired consistency was obtained. The cooled varnish base was thinned with 15 parts of mineral spirits and cobalt drier was added to yield a 0.01% solution based on cobalt metal. Films of this varnish baked dry at 125° C. within 20 minutes.

*Example 4.*—1 part of dipolymer and 3 parts of raw tung oil were heated at 250° C. until the desired consistency was obtained. The cooled varnish base was thinned with 4 parts of mineral spirits and cobalt drier was added as above. Films of this varnish baked dry at 125° C. within 20 minutes.

Films of the above varnish containing 0.0075% cobalt, 0.0069% manganese and 0.0853% lead air-dried within 10 hours.

*Example 5.*—2 parts of dipolymer, 4 parts of oiticica oil, and 3 parts of rosin maleic glyceride resin (Amberol #801) were heated at 250° C. until the desired consistency was obtained. The cooled varnish was thinned with 9 parts of mineral spirits, and cobalt drier was added to yield a 0.02% solution based on cobalt metal. Films of this varnish baked dry at 125° C. within 30 minutes.

What I claim is:

1. The process of making a varnish base which consists in heating at a temperature above about 200° C. a mixture containing a liquid terpene dipolymer boiling at 193–195° C. at 25 mm. pressure and a drying oil containing conjugated double bonds.

2. The process of making a varnish base which consists in heating at a temperature above about 200° C. a mixture containing a liquid terpene dipolymer boiling at 193–195° C. at 25 mm. pressure and tung oil.

IRVING PÖCKEL.